United States Patent [19]

Onishi

[11] Patent Number: 4,816,540

[45] Date of Patent: Mar. 28, 1989

[54] CATIONIC GRAFT-COPOLYMER

[76] Inventor: Yasuhiko Onishi, 39-4, Kosora-cho, Seto-shi, Aichi-ken, Japan

[21] Appl. No.: 62,364

[22] Filed: Jun. 12, 1987

[51] Int. Cl.$^4$ .............................................. C08G 18/00
[52] U.S. Cl. ............................ 527/300; 527/312; 527/313; 527/315
[58] Field of Search ................ 527/300, 312, 313, 315

[56] References Cited

U.S. PATENT DOCUMENTS 3,985,616 10/1976 Weaver et al. .................. 527/314
4,618,664 10/1986 Ohnishi ............................ 527/312
4,684,708 8/1987 Deets et al. ...................... 527/312

Primary Examiner—Veronica P. Hoke
Assistant Examiner—Nathan M. Nutter
Attorney, Agent, or Firm—Spencer & Frank

[57] ABSTRACT

A cationic graft-copolymer comprising a unit derived from a cationic derivative of a water-soluble linear polymers having a hydroxyl groups, namely, a cationic polysaccharide of the following formula (1)

$$[C_6H_7O_2(OH)_{3-a}(OX)_a]_x H_2O \qquad (1)$$

and the cationic derivative of polyvinylalcohol of the following formula (2) or the cationic derivative of the partial hydrolyzed polyvinylalcohol of the following formula (3)

$$[CH_2CH(OH)_{1-b}(OX)_b]_n \qquad (2)$$

$$[CH_2CH(OH)_{1-b-c}(OX)_b(OAc)_c]_n \qquad (3)$$

and a unit derived from a polymerizable olefin compound of the following formula (4)

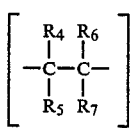

(a, x, b, n, c, Ac, X, $R_4$, $R_5$, $R_6$, and $R_7$ are defined in claim 1–4); a process for preparing the same and a latex reagent made therefrom.

6 Claims, 1 Drawing Sheet

4,816,540

CATIONIC GRAFT-COPOLYMER

BACKGROUND OF THE INVENTION

This invention relates to a novel cationic copolymers which were obtained by graft-polymerizing an olefin monomer onto a cationic derivative of a water-soluble linear polymer having hydroxyl groups. Recently, the mechanism of the reaction between antigen and antibody has been studied and clinical tests have become easy to carry out by using the following L.A. reaction. Namely, a latex sensitized with an antibody or an antigen is agglutinated by an antigen or an antibody, and by using the phenomenon it can be confirmed rapidly whether the antigen or the antibody is in existence. The latex used for the L.A. (Latex Agglutination) test should be stable and a soapless pure substance desirably. It is shown in U.S. Pat. No. 3,989,656 that a dextran-alkyl methacrylate graft composition is obtained by polymerizing an olefin monomer onto a water-soluble linear polymer dextran in water using ceric ammonium nitrate.

The present invention provides a novel graft-copolymer which is composed of a cationic derivative of a water-soluble linear polymer and an olefin monomer. The present invention also provides a method of graft-polymerizing an olefin monomer onto the cationic derivative of a water-soluble linear polymer in water using ceric ammonium nitrate to get a stable and soapless latex of the graft-copolymer.

SUMMARY OF INVENTION

The cationic graft-copolymer of this invention is obtained by graft-polymerizing an olefin monomer onto a cationic derivative of a water-soluble linear polymer having hydroxyl groups. A further object of the invention is to provide a stable soapless latex of the cationic graft-copolymer for identification of an antigen or an antibody by an antibody or an antigen coated it, namely, an immunoassay by analysis of latex agglutination reaction. The novel latex of the invention is also useful as a paint and a coating material for its cationic property. A latex is usually synthesized in the presence of an anionic or nonionic surface active agent to be emulsion-polymerized, but this surface active agent remaining in the latex system is harmful for a stability of the latex and its function such as a adsorbing power. The novel latex of the cationic graft-copolymer of the invention is a stable soapless type and is prepared by graft-polymerizing a olefin monomer onto a cationic derivative of a water-soluble linear polymer having hydroxyl groups using tetravalent ceric ion in water. The resultant latex has a strong adsorbing power with a protein in its anionic region because of the cationic property and the hydrophobic domain of the graft-copolymer is able to have a specific adsorbing power with a protein, a polystyrene latex by changing pH and ion strength. The latex of the invention is poured into an organic solvent such as methanol to form a precipitate, which is washed with water, centrifuged, and dried. The graft-copolymer so obtained is also useful as a micro carrier for cell cultivation and Immunoadsorbent because of its cationic property.

DESCRIPTION OF THE PREFERRED EMBODIMENTS

Figure 1:
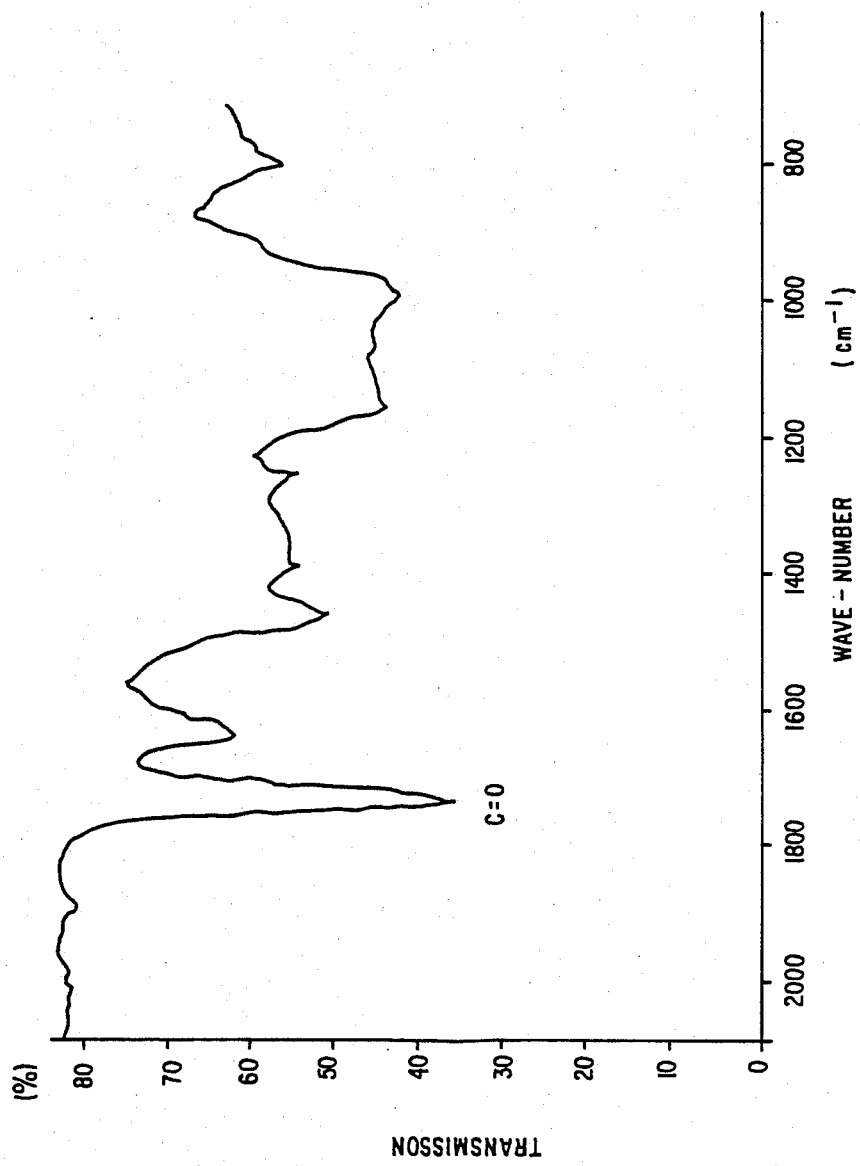
FIG. 1 is a diagram showing the infrared absorption spectra of DEAE(2-diethylaminoethyl)-dextran-methyl methacrylate graft copolymer according to EXAMPLE 1 of this invention.

The cationic copolymer of this invention can be produced by graft-polymerizing an olefin monomer onto a cationic derivative of a water-soluble linear polymer having hydroxyl groups using a redox initiator. The latex of the cationic graft-copolymer is obtained when the above-mentioned graft-polymerization is carried out in water. The simple polysaccharide cationic derivative which is used here as a water-soluble linear polymer of this invention such as dextran, pullulan, and dextrin etc. is comprised of a unit derived from the simple polysaccharide, of the following formula (1)

$$[C_6H_7O_2(OH)_{3-a}\cdot(OX)_a]_x\cdot H_2O \quad (1)$$

The polyvinylalcohol cationic derivative which is used here as a water-soluble linear polymer of this invention is comprised of a unit derived from the polyvinylalcohol of the following formula (2) or a partial hydrolyzed alcohol of the following formula (3)

$$-\!\!\left[CH_2CH(OH)_{1-b}(OX)_b\right]\!\!-_n \quad (2)$$

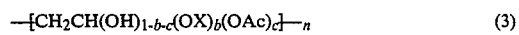

$$-\!\!\left[CH_2CH(OH)_{1-b-c}(OX)_b(OAc)_c\right]\!\!-_n \quad (3)$$

Wherein X is a $-(CH_2)_m R_1$ organic radical where $R_1$ is a member of the class consisting of $-NH_2$ radical, $-N(CH_3)_2$ radical, $-N(C_2H_5)_2$ radical, $-N^+(C_2H_5)_3$ radical, $-C_6H_4.NH_2$ radical, and $-CO.C_6H_4.NH_2$ radical, $-COR_2$ radical where $R_2$ is $-CH_2.NH_2$ or $-C_6H_4.NH_2$, $-CH_2CH(OH).CH_2R_3$ radical where $R_3$ is $-NH_2$, $-N(CH_3)_2$, $-N(C_2H_5)_2$, and $-N^+(C_2H_5)_3$, m is a natural number of 1 to 3, a is a positive number having a value of $0<a<3$, b is a positive number having a value of $0<b<1$, x and n are natural numbers having a value of 5 or more, $1>b+c$, and AC is acetyl radical.

Other water-soluble linear polymers which are a water-soluble linear polymers having a hydroxyl groups can be used as starting materials besides the above-mentioned polymers. Examples of such other polymers are polyHEMA(2-hydroxyethyl methacrylate), the partial hydrolyzed polyvinyl acetates, and a water-soluble starch etc. These polymers have as a common property that each is a water-soluble linear polymer having a hydroxyl groups, so that their hydroxyl groups can be easily replaced by the above-mentioned cationic groups reacting the chloride of the above-mentioned cationic group (X.Cl) with their hydroxyl group in the presence of alkali such as sodium hydroxide, potassium hydroxide, and sodium carbonate and can easily form a alcohol redox system by redox initiators to polymerized olefin monomers onto them. Examples of such a redox initiator are a tetravalent ceric salt, a tetravalent manganese salt, and a ferric salt—hydrogenperoxide etc.

The polymerizable olefin monomer is a compound which can form the recurring units shown in the parenthesis in the formula (4) upon polymerization.

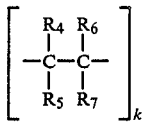

Wherein $R_4$, $R_5$ and $R_6$ are each selected from the group consisting of hydrogen and $CH_3$ and $R_7$ is a member of the group consisting of

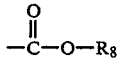

Where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylaminoalkyl radicals, glycidyl radical, tetrahydrofuran radical, $C_1$-$C_4$ lower alkyl-substituted tetrahydrofuran radical, benzyl radical, the $(CH_2CH_2O)_yCH_2CH_2OH$ radical where y is a positive integer from 1 to 10, and $-N(R_9)_2$ where the two $R_9$,s which may be the same or different, are either hydrogen or a $C_1$-$C_4$ alkyl radical;

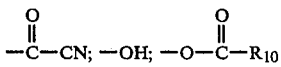

Where $R_{10}$ is a $C_1$-$C_8$ alkyl radical; phenyl radical; tolyl radical; pyridine radical; pyrrolidone radical; and

Where $R_{11}$ is $NH_2$, $NHCH_3$, N,N-dimethylamino radical, N,N-dimethylaminopropylamino radical, and morpholine radical.

As the polymerizable olefin compound from which the unit expressed by the foregoing formula (4) is derived, there can be mentioned the alpha, beta-unsaturated acids such, for example,as acrylic acid and methacrylic acid; the alkyl esters of these alpha, beta-unsaturated acids; cyclohexyl ester or lower alkyl substituted cyclohexyl ester of the foregoing alpha, beta-unsaturated acids; the $C_1$-$C_4$ hydroxyalkyl esters of the alpha, beta-unsaturated acids such as the 2-hydroxyethyl esters, 2-hydroxypropyl ester and 2-hydroxybutyl ester of the foregoing alpha, beta-unsaturated acids; the amides or alkyl amides of the foregoing alpha, beta-unsaturated acids such as acrylamide, methacrylamide, acryl- or methacrylamide, acryl- or methacryldimethylamide, acryl- or methacryl-N,N-dimethylaminopropylamide, acryl- or methacrylmorpholineamide; the $C_1$-$C_8$ aminoalkyl esters of the aforesaid alpha, beta-unsaturated acids; the $C_1$-$C_8$ dialkylaminoalkyl esters of the aforesaid alpha, beta-unsaturated acids; the glycidyl estersof the foregoing alpha, beta-unsaturated acids; the tetrahydrofurfuryl esters of the aforesaid alpha, beta-unsaturated acids; the benzyl esters of the foregoing alpha, beta-unsaturated acids; the polyethylene glycol monoesters such as the diethylene glycol, triethylene glycol and tetraethylene glycol monoesters of the aforesaid alpha, beta-unsaturated acids; the nitriles of the foregoing alpha, beta-unsaturated acids such as acrylonitrile and methacrylonitrile; vinyl alcohol, methylvinyl alcohol and dimethylvinyl alcohol; the $C_1$-$C_8$ alkyl esters of vinyl alcohol or the foregoing methyl-substituted vinyl alcohols such as vinyl acetate, vinyl propionate and vinyl butylate; styrene; alpha-methylstyrene and vinyl toluene; vinylpyridine; vinylpyrrolidone; and vinylmethylpyrrolidone.

The cationic graft-copolymer of this invention consisting essentially of the water-soluble liner polymer cationic derivative units of the above formulae (1), (2), or (3) and the polymerized olefin compound units of the above formulae (4) wherein k is an integer of 10 to 200,000 usually can be obtained by reacting the cationic derivative of the water-soluble linear polymer having a hydroxyl groups with a polymerizable olefin monomer in the presence of a redox initiator in the absence of molecular oxygen in a water. If desired, the use of the catalyst compound may be omitted, and the materials may be heat-polymerized under suspending or emulsifying conditions. Furthermore, it is also possible to polymerize the materials in solution by applying actinic radiation such as gamma-rays, X-rays, electron rays or ultraviolet rays.

Representative of redox initiators are a tetravalent cerium compounds. An intermediate complex between $Ce^{4+}$ ion and a hydroxyl group of the backbone polymer is formed and the oxidation-reduction proceeds via free radicals, capable of initiating vinyl polymerization. At this time, the presence of molecular oxygen reduces the activity of the redox initiator, and therefore, the reaction is desirably carried out after purging the reaction solution with nitrogen. The pH of the reaction system is not more than 6, preferably not more than 3 under acidic conditions. Examples of such a cerium compound are cerium ammonium nitrate, cerium sulfate, cerium ammonium sulfate, cerium nitrate, and cerium ammonium pyrophosphate. The reaction can be performed at room temperature, and temperature within a range of 0° to 80° C. are generally employed. When the initiator is utilized, the concentrations of the backbone polymer (the cationic derivative of the water-soluble linear polymer which is used in this invention), the polymerizable olefin monomer and the initiator based on the total volume of the reaction system can be varied freely. For example, the preferred DEAE(2-diethylaminoethy)-dextran hydrochloride concentration is 0.5 to 25 wt/vol %, the concentration of the methylmethacrylate 1 to 35 wt/vol %, and the cerium initiator concentration $5.5 \times 10^{-3}$ to $11 \times 10^{-1}$ mol/liter. The resulted latex of the cationic graft-copolymer can be purified to remove the residual monomer and the initiator by dialysis and reverse osmotic.

Where the redox initiator is used, it may be deactivated after reaction by using a deactivating agent such as hydroquinone, sodium sulfate or ferrous sulfate. When a cationic graft-copolymer is wanted itself, the reaction product is precipitated using an alcohol. The by-product homopolymer may be removed with a suitable solvent such as acetone, tetrahydrofuran, dimethyl formamide, ethyl acetate or chloroform. The cationic graft-copolymer so obtained is useful as a micro carrier for cell cultivation when it conforms to the following conditions:

1. The particles of the graft-copolymer can fall smoothly when stationary.
2. The particles of the graft-copolymer can float smoothly when stirred.

The particles of the graft-copolymer of this invention, of course, have a cationic property. These are why it is useful for a micro carrier of cell cultivation.

EXAMPLE 1

2 g of DEAE(2-diethylaminoethyl)-dextran hydrochloride (nitrogen content 5%) derived from dextran having a weight average molecular weight of 500,000 was dissolved in 50 ml of water, and then 30 ml. of methyl methacrylate (MMA) and 5 ml. of methanol was added. With stirring, the air in the reaction vessel was fully replaced with nitrogen gas. To the solution were added 0.19 g of ceric ammonium nitrate and 15 ml. of 0.1N nitric acid, and the mixture was reacted with stirring for 1 hour at 30° C. Then, 3 ml. of a 1% aqueous solution of hydroquinone was added to stop the reaction. The reaction mixture was poured into methanol to form a precipitate. The precipitate formed was washed with hot water, centrifuged, and dried at 50° C. under reduced pressure. The crude DEAE-dextran-MMA copolymer so obtained was placed in a Soxhlet extractor, and extracted for 24 hours continuously using acetone, to afford 1.5 g of a purified DEAD-dextran-MMA copolymer. The yield of DEAE-dextran was 30%, the nitrogen content was 2%, and the grafting(%) was 150%. The grafting(%) is expressed by the following equation.

$$\text{Grafting}(\%) = (\text{weight of MMA graft-polymerized/weight of DEAE-dextram hydrochloride in the copolymer}) \times 100$$

The resulted DEAE-dextran-MMA copolymer is insoluble in water and acetone at 25° C. In view of the fact that DEAE-dextran hydrochloride is soluble in water and poly(MMA) is soluble in acetone, it is evident that the DEAE-dextran-MMA copolymer is not a mixture of DEAE-dextran and polym(MMA).

FIG. 1 shows the infrared absorption spectra of the resulting DEAE-dextran-MMA copolymer. The spectrum of the copolymer has some characteristic absorption bands at 1730 cm$^{-1}$ and at 1000 to 1150 cm$^{-1}$, which is attributed to the carbonyl group of poly(MMA) and the pyranose ring of DEAE-dextran, respectively. Thus, the resulting DEAE-dextran-MMA copolymer exhibits different solubility from DEAE-dextran and poly(MMA) and shows the above-described characteristic absorption in infrared absorption spectrum. From this fact, it is judged that the resulting DEAE-dextran-MMA copolymer is a novel compound graft-polymerized.

EXAMPLE 2

The procedure of EXAMPLE 1 was repeated till stopping the reaction by adding 3 ml. of a 1% aqueous solution of hydroquinone, and then the resulted latex of DEAE-dextran-MMA copolymer was purified to remove the unreacted MMA, cerric salts, and nitric acid to be done a water dialysis by using cellophane tube. The resulted latex of DEAE-dextran-MMA copolymer was stable and soapless. To the 2% solution of the resulted latex of DEAE-dextran-MMA copolymer was added drop by drop with stirring a equivalent of a denatured human gamma-globulin diluted by a glycine saline buffer diluent (0.05 mol/l, pH8.2) (GB) so that the RA(rheumatoid)-test latex-globulin reagent obtained is prepared to be 20 μg/mg-latex. The reaction was maintained for 2 hours with stirring at room temperature, and then the reaction mixture was centrifuged for 30 minutes at 4000 r.p.m., washed with GB, prepared to be 1% as latex solution by GB or GB containing bovine serum albumin if needed, and stocked at 4° C. To a clean slide glass was dropped the 0.05 ml. of the RA-test positive control serum diluted to 1/20 by GB, and then the above sensitized RA-test latex of the graft-copolymer was dropped to the above RA-test positive control serum and stirred. The coagulation was observed to wait for 1 minute after rocking the clean slide. But the coagulation was not observed when the above procedure was repeated with the RA-test negative control serum diluted to 1/20 by GB.

EXAMPLE 3

Examples 1 was repeated except that 2 g of TEAE(-triethylaminoethyl)-dextan hydrochloride (nitrogen content 2%) derived from dextran having a weight average molecular weight of 300,000, 15 ml. of methyl acrylate (MA), 10 ml. of methanol, and 0.25 g of ceric ammonium nitrate were used, and 2 g of a purified TEAE-dextan-MA copolymer was obtained. The yield of TEAE-dextran was 35%, the nitrogen content was 0.7%, and the grafting(%) was 185%. The resulted TEAE-dextran-MA copolymer is insoluble in water and acetone at 25° C.

EXAMPLE 4

Example 3 was repeated except that 2 g of TEAE(-triethylaminoethyl)-polyvinylalcohol (PVA) hydrochloride (nitrogen content 2%) derived from PVA having a weight average molecular weight of 300,000 was used, and 2 g of a purified TEAE-PVA-MA copolymer was obtained. The yield of TEAE-PVA was 33%, the nitrogen content was 0.67%, and the grafting(%) was 200%. The resulted TEAE-PVA-MA copolymer is insoluble in water and acetone at 25° C.

EXAMPLE 5

The procedure of Example 2 was repeated with Example 4 to result the latex of TEAE-PVA-MA copolymer and the sensitized latex of the copolymer for RA-test. The coagulation was observed with the RA-test positive control serum diluted to 1/20 and not observed with the RA-test negative one.

EXAMPLE 6

Example 1 was repeated, except that 4 g of DEAE(2-diethylaminoethyl)-pullulan hydrochloride (nitrogen content 4%) derived from a pullulan having a weight average molecular weight of 200,000, 80 ml. of water, 35 ml. of purified styrene monomer, 10 ml. of methanol, 30 ml. of 0.1N nitric acid, 0.2 g of ceric ammonium nitrate, and tetrahydrofuran for a Soxhlet extract were used, to afford 6 g of a purified DEAE-pullulan-styrene copolymer. The yield of DEAE-pullulan was 43%, the nitrogen content was 1.14%, and the grafting(%) was 250%. The resulted DEAE-pullulan—styrene copolymer is insoluble in water and tetrahydrofuran.

EXAMPLE 7

The procedure of Example 2 was repeated with Example 6 to result the latex of DEAE-pullulan—styrene copolymer and the sensitized latex of the copolymer for RA-test. The coagulation was observed with the RA-test positive control serum diluted to 1/20 and not observed with the RA-test negative one.

EXAMPLE 8

The procedure of Example 2 was repeated with Example 3 to result the latex of TEAE-dextan—MA copolymer and the sensitized latex of the copolymer for RA-test. The coagulation was observed with the RA-test positive control serum diluted to 1/20 and not observed with the RA-test negative one.

EXAMPLE 9

Example 1 was repeated, except that 4 g of AE(aminoethyl)-dextran hydrochloride (nitrogen content 5%)derived from dextran having a weight average molecular weight of 40,000, 90 ml. of water, 20 ml. of butyl methacrylate (BMA), and 0.15 g of ceric ammonium nitrate, to afford 6 g of a purified AD-dextran—BMA copolymer. The yield of AE-dextran was 60%, the nitrogen content was 2%, and the grafting(%) was 150%. The resulted AE-dextran—BMA copolymer is insoluble in water and acetone.

EXAMPLE 10

The procedure of Example 2 was repeated with Example 9 to result the latex of AE-dextran—BMA copolymer and the sensitized latex of the copolymer for RA-test. The coagulation was observed with the RA-test positive control serum diluted to 1/20 and not observed with the RA-test negative one.

EXAMPLE 11

Example 1 was repeated, except that 4 g of HPTMA(2-hydroxypropyltrimethylammonium)-pullulan hydrochloride (nitrogen content 3%) derived from pullulan having a weight average molecular weight of 30,000, 100 ml. of water, 30 ml. of methyl acrylate (MA), 20 ml. of 0.1N nitric acid, 0.2 g of ceric ammonium nitrate, 4 ml. of a 1% aqueous solution of hydroquinone, and not 5 ml. of methanol were used, to afford 2 g of a purified HPTMA-pullulan—MA copolymer. The yield of HPTMA-pullulan was 33%, the nitrogen content was 2%, and the grafting(%) was 50%. The resulted HPTMA-pullulan—MA copolymer is insoluble in water and acetone.

EXAMPLE 12

The procedure of Example 2 was repeated with Example 11 to result the latex of HPTMA-pullulan—MA copolymer and the sensitized latex of the copolymer for RA-test. The coagulation was observed with the RA-test positive control serum diluted to 1/20 by GB and not observed with the RA-test negative one.

Cross-Reference to Related Application

In addition, this application corresponds to my Japanese Patent Laid-Open Publication No. Sho 61-126119, published on June 13th, 1986, the entire disclosure of which is incorporated herein by reference.

What is claimed is:

1. A cationic graft-copolymer comprising a unit derived from a cationic polysaccharide of the following formula (1)

$$[C_6H_7O_2(OH)_{3-1}\cdot(OX)_a]_x\cdot H_2O \qquad (1)$$

wherein X is a $-(CH_2)_mR_1$ organic radical where $R_1$ is a member of the group consistingof $-NH_2$ radical, $-N(CH_3)_2$ radical, $-N(C_2H_5)_2$ radical, $-N^+(C_2H_5)_3$ radical, $-C_6H_4\cdot NH_2$ radical, and $-CO\cdot C_6H_4\cdot NH_2$ radical, $-COR_2$ radical where $R_2$ is $-CH_2\cdot NH_2$ or $-C_6H_4\cdot NH_2$, $-CH_2CH(OH)\cdot CH_2R_3$ radical where $R_3$ is $-NH_2$, $-N(CH_3)_2$, $-N(C_2H_5)_2$, and $-N^+C_2H_5)_3$, m is a natural number of 1 to 3, a is a positive number having a value of $0<a<3$, and x is a natural number having a value of 5 or more; and a unit derived from a polymerizable olefin compound of the following formula (4)

$$\begin{bmatrix} R_4 & R_6 \\ | & | \\ -C-C- \\ | & | \\ R_5 & R_7 \end{bmatrix} \qquad (4)$$

wherein $R_4$, $R_5$ and $R_6$ are each selected from the group consisting of hydrogen and $CH_3$ and $R_7$ is a member of the group consisting of $$\begin{matrix} O \\ \| \\ -C-O-R_8 \end{matrix}$$

where $R_8$ is a member of the class consisting of hydrogen, $C_1$–$C_{12}$ alkyl radicals, cyclohexyl radical, $C_1$–$C_4$ hydroxyalkyl radicals, $C_1$–$C_8$ aminoalkyl radicals, $C_1$–$C_8$ dialkylamino alkyl radicals, glycidyl radical, tetrahydrofuran radical, $C_1$–$C_4$ lower alkyl-substituted tetrahydrofuran radical, benzyl radical, the $(CH_2CH_2O)_yCH_2CH_2OH$ radical where y is a positive integer from 1 to 10, and $-N(R_9)_2$ where the two $R_9$,s which may be the same or different, are either hydrogen or a $C_1$–$C_4$ alkyl radical;

$$\begin{matrix} O & & & O \\ \| & & & \| \\ -C-CN; & -OH; & -O-C-R_{10} \end{matrix}$$

where $R_{10}$ is a $C_1$–$C_8$ alkyl radical; phenyl radical; tolyl radical; pyridine radical; pyrrolidone radical; and $$\begin{matrix} O \\ \| \\ -C-R_{11} \end{matrix}$$

where $R_{11}$ is $NH_2$, $NHCH_3$, N,N-dimethylamine radical, N,N-dimethylaminopropylamine radical, and morpholine radical.

2. A process for preparing a cationic graft-copolymer which comprises reacting a cationic polysaccharide of the following formula (1)

$$[C_6H_7O_2(OH)_{3-1}\cdot(OX)_a]_x\cdot H_2O \qquad (1)$$

wherein X is a $-(CH_2)_mR_1$ organic radical where $R_1$ is a member of the class consisting of $-NH_2$ radical, $-N(CH_3)_2$ radical, $-N(C_2H_5)_2$ radical, $-N^+(C_2H_5)_3$ radical, $-C_6H_4\cdot NH_2$ radical, and $-CO\cdot C_6H_4NH_2$ radical, $-COR_2$ radical where $R_2$ is $-CH_2\cdot NH_2$ or $-C_6H_4\cdot NH_2$, $-CH_2CH(OH)\cdot CH_2R_3$ radical where $R_3$ is $-NH_2$, $-N(CH_3)_2$, $-N(C_2H_5)_2$, and $-N^+(C_2H_5)_3$, m is a natural number of 1 to 3, a is a positive number having a value of $0<a<3$, and x is a natural number having a value of 5 or more; with a polymerizable olefin compound of the formula (4')

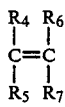 (4')

wherein $R_4$, $R_5$ and $R_6$ are each selected from the group consisting of hydrogen and $CH_3$ and $R_7$ is a member of the group consisting of

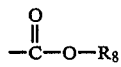

where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylamino alkyl radicals, glycidyl radical, tetrahydrofuran radical, $C_1$-$C_4$ lower alkyl-substituted tetrahydrofuran radical, benzyl radical, the $(CH_2CH_2O)_yCH_2CH_2OH$ radical where y is al positive integer from 1 to 10, and $-N(R_9)_2$ where the two $R_9$,s which may be the same or different, are either hydrogen or a $C_1$-$C_4$ alkyl radical;

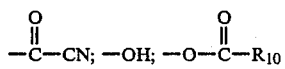

where $R_{10}$ is a $C_1$-$C_8$ alkyl radical; phenylradical; tolyl radical; pyridine radical; pyrrolidone radical; and

where $R_{11}$ is $NH_2$, $NHCH_3$, N,N-dimethylamine radical, N,N-dimethylaminopropylamine radical, and morpholine radical.

3. A latex reagent of a cationic graft-copolymer comprising a unit derived from a cationic polysaccharide of the following formula (1)

$$[C_6H_7O_2(OH)_{3-a}.(OX)_a]x.H_2O \quad (1)$$

wherein X is a $-(CH_2)_mR_1$ organic radical where $R_1$ is a member of the class consisting of $-NH_2$ radical, $-N(CH_3)_2$ radical, $-N(C_2H_5)_2$ radical, $-N^+(C_2H_5)_3$ radical, $-C_6H_4.NH_2$ radical, and $-CO.C_6H_4NH_2$ radical, $-COR_2$ radical where $R_2$ is $-CH_2.NH_2$ or $-C_6H_4.NH_2$, $-CHhd 2CH(OH).CH_2R_3$ radical where $R_3$ is $-NH_2$, $-N(CH_3)_2$, $-N(C_2H_5)_2$, and $-N^+(C_2H_5)_3$, m is a natural number of 1 to 3, a is a positive number having a value of $0<a<3$, and x is a natural number having a value of 5 or more; and a unit derived from a polymerizable olefin compound of the following formula (4)

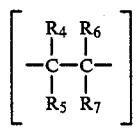 (4)

wherein $R_4$, $R_5$ and $R_6$ are each selected from the group consisting of hydrogen and $CH_3$ and $R_7$ is a member of the group consisting of

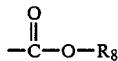

where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialylamino alkyl radicals, glycidyl radical, tetrahydrofuran radical, $C_1$-$C_4$ lower alkyl-substituted tetrahydrofuran radical, benzyl radical, the $(CH_2CH_2O)_yCH_2CH_2OH$ radical where y is a positive integer from 1 to 10, and $-N(R_9)_2$ where the two $R_9$,s which may be the same or different, are either hydrogen or a $C_1$-$C_4$ alkyl radical;

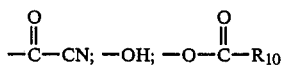

where $R_{10}$ is a $C_1$-$C_8$ alkyl radical; phenyl radical; tolyl radical; pyridine radical; pyrrolidone radical; and

Where $R_{11}$ is $NH_2$, $NHCH_3$, N,N-dimethylamine radical, N,N-dimethylaminopropylamine radical, and morpholine radical.

4. A process for preparing a latex reagent of a cationic graft-copolymer which comprises reacting a cationic polysaccharide of the following formula (1)

$$[C_6H_7O_2(OH)_{3-a}.(OX)_a]x.H_2O \quad (1)$$

wherein X is a $-(CH_2)_mR_1$ organic radical where $R_1$ is a member of the class consisting of $-NH_2$ radical, $-N(CH_3)_2$ radical, $-N(C_2H_5)_2$ radical, $-N^+(C_2H_5)_3$ radical, $-C_6H_4.NH_2$ radical, and $-CO.C_6H_4NH_2$ radical, $-COR_2$ radical where $R_2$ is $-CH_2.NH_2$ or $-C_6H_4NH_2$, $-CH_2CH(OH).CH_2R_3$ radical where $R_3$ is $-NH_2$, $-N(CH_3)_2$, $-N(C_2H_5)_2$, and $-N^+(C_2H_5)_3$, m is a natural number of 1 to 3, a is a positive number having a value of $0<a<3$, and x is a natural number having a value of 5 or more; with a polymerizable olefin compound of the formula (4')

 (4')

wherein $R_4$, $R_5$ and $R_6$ are each selected from the group consisting of hydrogen and $CH_3$ and $R_7$ is a member of the group consisting of

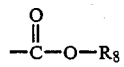

Where $R_8$ is a member of the class consisting of hydrogen, $C_1$-$C_{12}$ alkyl radicals, cyclohexyl radical, $C_1$-$C_4$ hydroxyalkyl radicals, $C_1$-$C_8$ aminoalkyl radicals, $C_1$-$C_8$ dialkylamino alkyl radicals, glycidyl radical, tetrahydrofuran radical, $C_1$-$C_4$ lower alkyl-substituted tetrahydrofuran radical, benzyl radical, the $(CH_2CH_2O)_yCH_2CH_2OH$ radical where y is a positive integer from 1 to 10, and $-N(R_9)_2$ where the two $R_9$,s which may be the same or different, are either hydrogen or a $C_1$–$C_4$ alkyl radical;

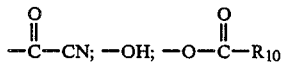

where $R_{10}$ is a $C_1$–$C_8$ alkyl radical; phenyl radical; tolyl radical; pyridine radical; pyrrolidone radical; and

where $R_{11}$ is $NH_2$, $NHCH_3$, N,N-dimethylamine radical, N,N-dimethylaminopropylamine radical, and morpholine radical.

5. A micro carrier for cell cultivation formed from the cationic graft-copolymer of claim 1.

6. A immunoadsorbent formed from the cationic graft-copolymer of claim 1.

* * * * *